(12) United States Patent
Su

(10) Patent No.: US 9,333,640 B2
(45) Date of Patent: May 10, 2016

(54) ROTARY JOINT AND WORKTABLE USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Gui-Hai Su, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/513,431

(22) Filed: Oct. 14, 2014

(65) Prior Publication Data

US 2015/0107495 A1   Apr. 23, 2015

(30) Foreign Application Priority Data

Oct. 18, 2013 (CN) .......................... 2013 1 0489775

(51) Int. Cl.
*A47B 37/00* (2006.01)
*B25H 1/02* (2006.01)
*F16L 39/04* (2006.01)

(52) U.S. Cl.
CPC .. *B25H 1/02* (2013.01); *F16L 39/04* (2013.01)

(58) Field of Classification Search
CPC .... A47B 97/00; A47B 21/06; A47B 21/0314; A47B 2021/066; A47B 2021/062; A47B 2037/005

USPC ........ 108/50.01, 50.02, 50.11, 50.18, 94, 95; 312/223.3, 223.5, 223.6, 209; 384/513, 384/91, 94

See application file for complete search history.

(56) References Cited

U.S. PATENT DOCUMENTS

| 3,181,484 A | * | 5/1965 | Keppler | ................... | B01L 9/02 108/50.02 |
| 5,065,832 A | * | 11/1991 | Mark | ..................... | A47B 21/06 108/50.02 |
| 5,482,383 A | * | 1/1996 | Gantt | .................. | F16C 35/0635 384/513 |

(Continued)

FOREIGN PATENT DOCUMENTS

| CN | 102235561 A | 11/2011 |
| CN | 202880713 U | 4/2013 |
| JP | 2002276881 A | 9/2002 |

*Primary Examiner* — Jose V Chen
(74) *Attorney, Agent, or Firm* — Novak Druce Connolly Bove + Quigg LLP

(57) ABSTRACT

A rotary joint includes an input member and an output member rotatably sleeved on the input member. The input member defines a through hole extending along a vertical axis of the input member. A plurality of mounting portions circumferentially protrudes from an outer surface of the input member. Each two adjacent of the plurality of mounting portions form a first receiving groove. A plurality of transmission holes is defined in the input member. An opening of each transmission hole away from the end surface of the input member is formed in a sidewall of the first receiving groove. An output member is rotatably sleeved on the input member. Sidewalls of the first receiving groove and an inner wall of the output member cooperative form a channel. An outlet is defined in the inner wall of the output member. The invention also discloses a worktable using the rotary joint.

18 Claims, 5 Drawing Sheets

(56) References Cited

U.S. PATENT DOCUMENTS

| | | | | |
|---|---|---|---|---|
| 5,522,324 A * | 6/1996 | van Gelder | A47B 21/06 108/50.02 |
| 5,852,981 A * | 12/1998 | Henderson | A47B 13/02 108/150 |
| 5,881,500 A * | 3/1999 | Latino | A47B 21/06 52/220.7 |
| 5,899,025 A * | 5/1999 | Casey | E04B 2/7453 108/50.02 |
| 6,267,064 B1 * | 7/2001 | Ostertag | A47B 13/021 108/108 |
| 7,634,967 B1 * | 12/2009 | Albright | H02G 3/386 108/50.02 |
| 8,074,581 B2 * | 12/2011 | Epstein | A47B 37/00 108/50.01 |
| 2014/0238277 A1 * | 8/2014 | Fishman | A47B 37/00 108/25 |
| 2014/0331901 A1 * | 11/2014 | Seefeldt | A47B 21/06 108/50.02 |

* cited by examiner

ROTARY JOINT AND WORKTABLE USING THE SAME

FIELD

The present disclosure relates generally to rotary joints, and especially to a rotary joint and a worktable using the rotary joint.

BACKGROUND

A commonly used worktable includes a workstation, a conduit providing liquid to the workstation and a joint for fixing the conduit to the workstation.

BRIEF DESCRIPTION OF THE DRAWINGS

Implementations of the present technology will now be described, by way of example only, with reference to the attached figures.

DETAILED DESCRIPTION

Figure 1:
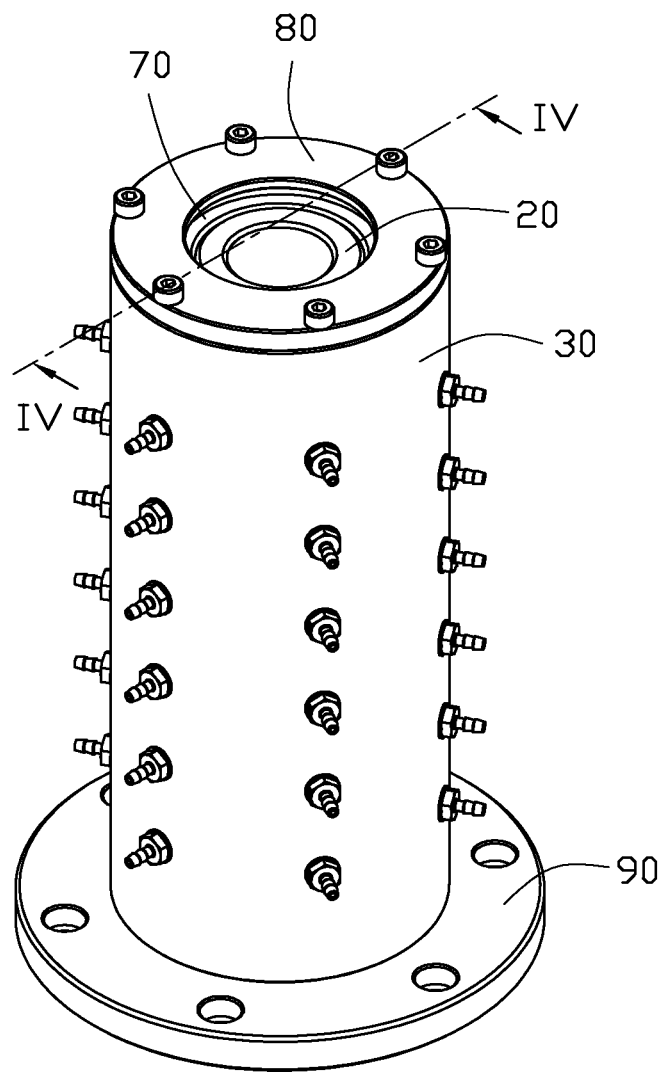
FIG. 1 is an isometric view of one embodiment of a rotary joint.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A rotary joint can include an input member and an output member rotatably sleeved on the input member. The input member can define a through hole extending along a vertical axis of the input member. A plurality of mounting portions can circumferentially protrude from an outer surface of the input member. Each two adjacent mounting portions of the plurality of mounting portions can cooperatively form a first receiving groove. A plurality of transmission holes can be defined in the input member. An opening of each transmission hole away from the end surface of the input member can be formed in a sidewall of the first receiving groove. Sidewalls of the first receiving groove and an inner wall of the output member can cooperatively form a channel. A plurality of outlets can be defined in the inner wall of the output member. Each outlet can be coupled to corresponding one channel and extends through an outer wall of the output member.

Figure 2:
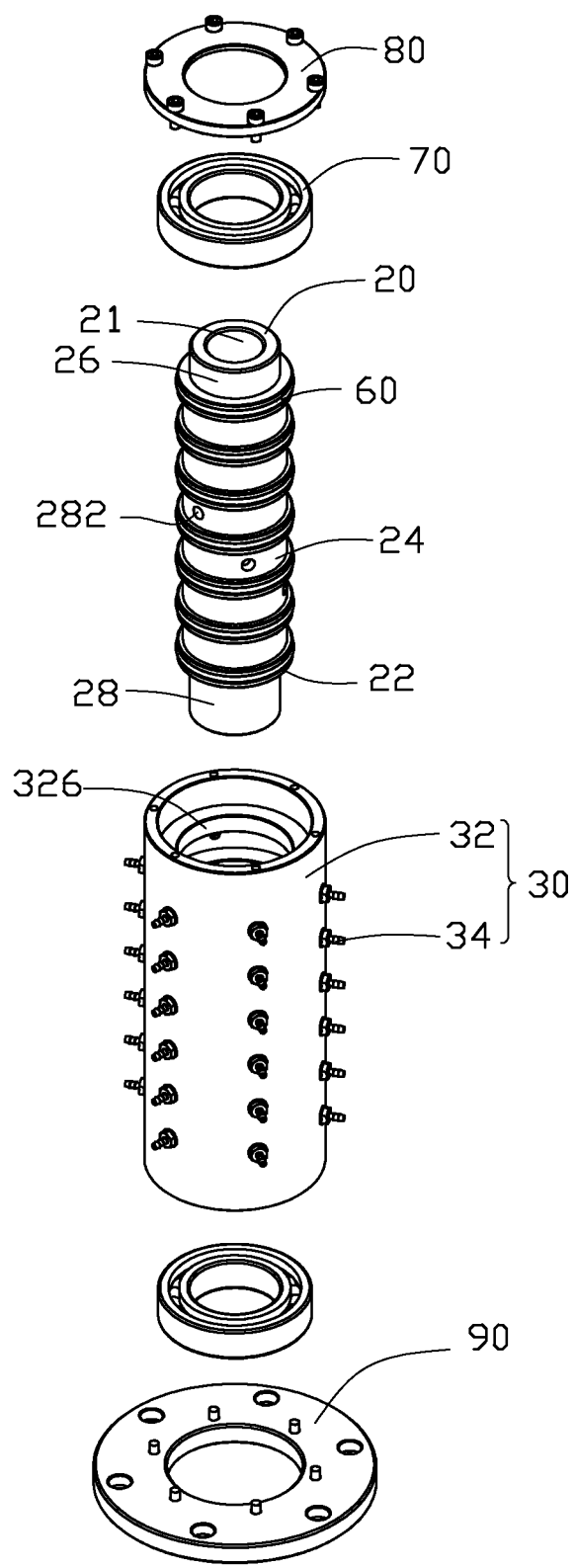
FIG. 2 is an exploded, isometric view of the rotary joint of FIG. 1.
Figure 3:
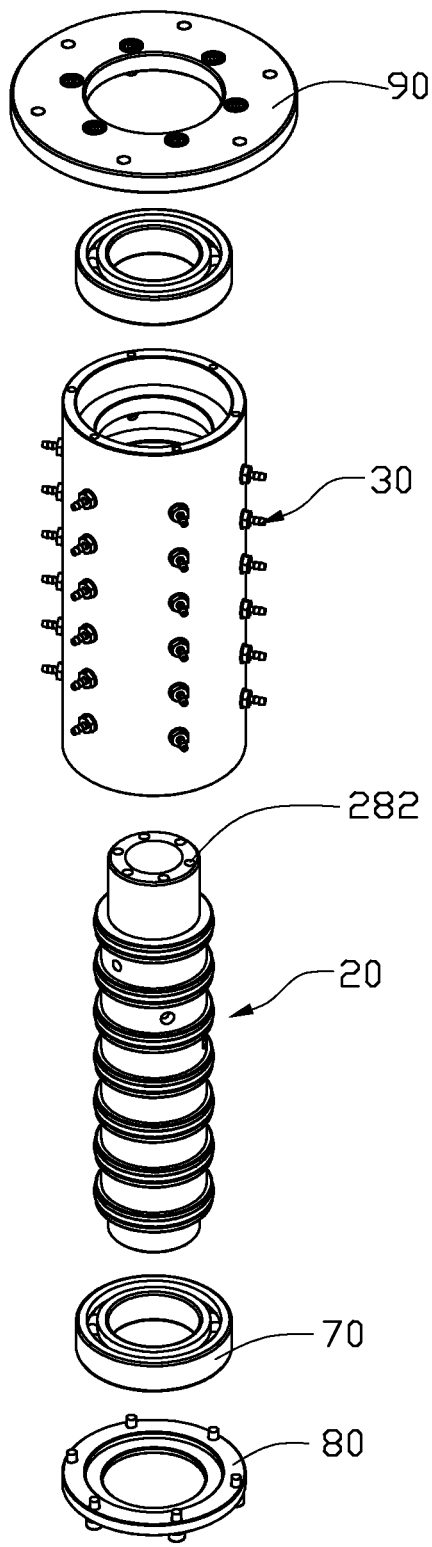
FIG. 3 is similar to FIG. 2, but from another angle.

Referring to FIG. 1, an embodiment of a rotary joint 100 can include an input member 20, an output member 30, seven annular-shaped sealing members 60 (as shown in FIG. 2), two bearings 70, an upper cover 80, and a bottom cover 90. The output member 30 can be rotatably sleeved on the input member 20. Referring to FIGS. 2 and 3, the seven sealing members 60 can be separately sleeved on the input member 20. The sealing members 60 can be located between an outer wall of the input member 20 and an inner wall of the output member 30. One bearing 70 can be sleeved on one end portion of the input member 20, and another bearing 70 can be sleeved on another one end portion of the input member 20. The bearing 70 can be positioned between the input member 20 and the output member 30. The upper cover 80 can be positioned on a first end portion of the output member 20 and cover a portion of corresponding bearing 70, and the bottom cover 90 can be fixedly located on a second end portion of the output member 20 and cover a portion of another one bearing 70. The input member 20 can protrude from the bottom cover 90.

Figure 4:
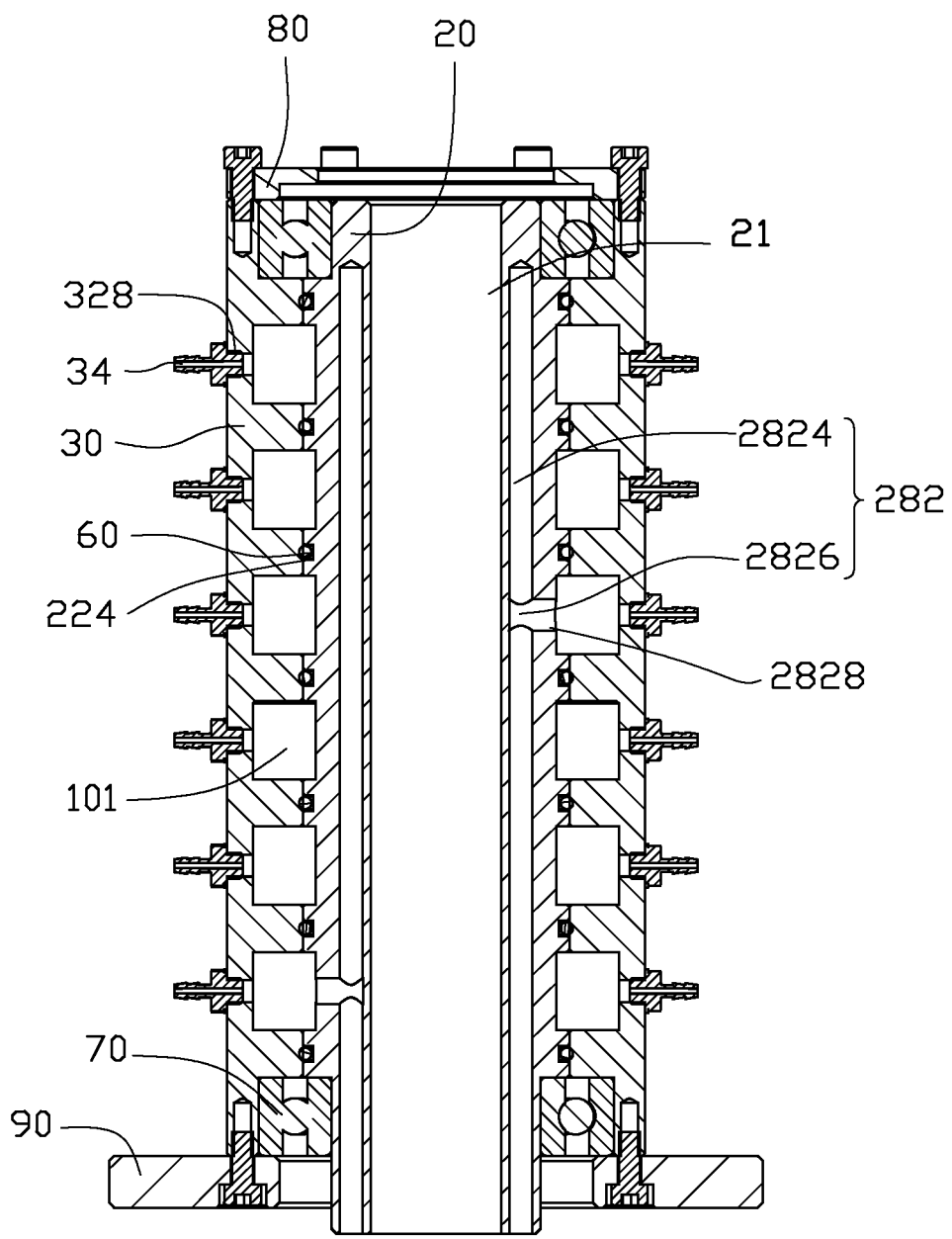
FIG. 4 is a cross-sectional view of the rotary joint of FIG. 1, taken along line IV-IV.

A through hole 21 can be defined in an end surface of the input member 20 along a vertical axis of the input member 20 for receiving cables, wires or pipes. Seven annular-shaped mounting portions 22 can separately protrude from the outer surface of the input member 20 along a circumferential direction of the input member 20. A mounting groove 224 (as shown in FIG. 4) can be recessed in each mounting portion 22 along a circumferential direction of the mounting portion 22. Each two adjacent mounting portions 22 can cooperatively form a first receiving groove 24 for receiving liquid or gas. The input member 20 can further include a first installation portion 26 and a second installation portion 28. The first installation portion 26 can be a first end portion of the input member 20 for fixing with the upper cover 80, and the second installation portion 28 can be a second end portion of the input member 20 for fixing with the bottom cover 90. Six transmission holes 282 can be separately defined in an end surface of the second installation portion 28 around the through hole 21. A shape of a cross section of each transmission hole 282 can be substantially T-shaped. Each transmission hole 282 can include a first transmission segment 2824 and a second transmission segment 2826 coupled to the first transmission segment 2824. The first transmission segment 2824 can extend from the second installation portion 28 along a direction parallel to the vertical axis of the input member 20. The second transmission segment 2826 can substantially perpendicularly extend from the first transmission segment 2824. An opening 2828 of each second transmission segment 2826 away from the first transmission segment 2824 can be formed in the outer wall of the input member 20. Each opening 2828 can be located in a bottom of corresponding one first receiving groove 24, such that the transmission hole 282 can communicate with the corresponding receiving groove 24 for avoiding mixing gas or liquid.

The output member 30 can include a base body 32 and a plurality of conduits 34 coupled to the base body 32. The base body 32 can be rotatably sleeved on the input member 20. Six second receiving grooves 326 can be recessed in the inner wall of the base body 24. Each second receiving groove 326 can communicate with corresponding one first receiving groove 24. Sidewalls of each first receiving groove 24 and sidewalls of one respective second receiving groove 326 can cooperatively form a channel 101. A plurality of outlets 328 can be defined in a sidewall of each second receiving grooves 326 and extend through an outer wall of the output member 30. Each conduit 34 can be mounted and received in one outlet 328 for leading the liquid out. In other embodiments, the number of the channels 101 can be at least two, the number of the transmission holes 282 can correspond to the number of the channels 101, the number of the outlet for each channel 101 can be one, two, three, and more. The rotary joint 100 can transmit more than one fluid at one time.

Also referring to FIG. 4, each sealing member 60 can be mounted in and received in one mounting groove 224. The sealing members 60 can be hermetically located between the input member 20 and the output member 30, such that each channel 101 can be a hermetical chamber. In other embodiments, each two adjacent sealing members 60 can cooperatively form one hermetical channel 101.

One bearing 70 can be sleeved on the first installation portion 26, and another one bearing 70 can be sleeved on the second installation portion 28. The bearings 70 can be located between the base body 32 and the input member 20 for decreasing friction between the output member 30 and the input member 20 in rotation. The upper cover 80 can be fixed on an end surface of the output member 30, and cover corresponding one bearing 70 sleeved on the second installation portion 28. The bottom cover 90 can be fixed on another end surface of the output member 30, and cover another one bearing 70 sleeved on the first installation portion 26. The first installation portion 26 can protrude from the bottom cover 90.

In assembly, each sealing member 60 can be positioned in and received in one mounting groove 224, the plurality of conduits 34 can be mounted on the base body 32. The output member 30 can be sleeved on the input member 20. The sealing member 60 can be located between the outer wall of the input member 20 and the inner wall of the output member 30. The two bearings 70 can be sleeved on the input member 20. The upper cover 80 and the bottom cover 90 can be fixed on the output member 30.

Figure 5:
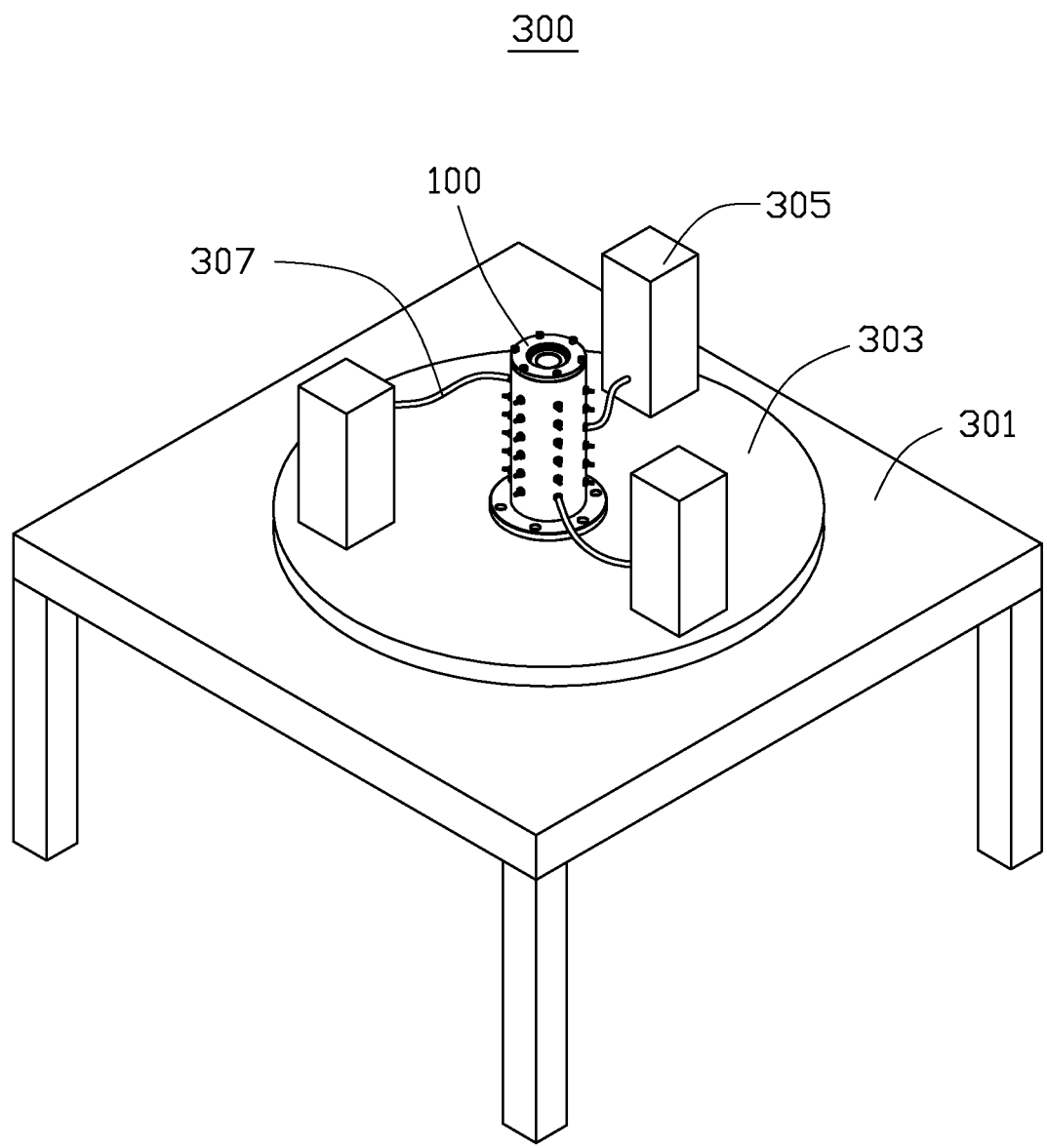
FIG. 5 is an isometric view of a worktable using the rotary joint of FIG. 1.

FIG. 5 illustrates a worktable 300 using the rotary joint 100. The worktable 300 can include a support 301, a rotary member 303 rotatably positioned on the support 301, a plurality of workstations 305 fixed on the rotary member 303 for manufacturing work pieces, and a plurality of transmitting conduits 307. The rotary member 303 can be fixed with the bottom cover 90. Each workstation 305 can be coupled to one conduit 34 by one transmitting conduit 307. The transmitting conduits 307 can be metal coils, or other transmitting pipes. The first transmission segment 2824 can be coupled with liquid sources, such that the liquid sources can be provide liquid such as gas or oil for the work stations 305. Cables, wires, pipes of the worktable can pass through the through hole 21 for protection. When the rotary member 303 rotates, the workstations 305, the output members 30 of the rotary joint 100 also rotates, following the rotary member 43. Because the channel 101 communicates with the transmission hole 282 when the output member 30 rotates, the liquid can be provided continuously from the liquid source.

In other embodiments, the sealing members 60 can be omitted. The second receiving grooves 326 and the mounting portions 22 can be omitted, when the sealing members 60 can be separately sleeved on the input member 20, and located between the input member 20 and the output member 30, such that channels 101 can be formed. The transmission holes 282 can be also defined in an end surface of the first installation portion 28 away from the second installation portion 28.

The embodiments shown and described above are only examples. Many details are often found in the art such as other features of a input member. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A rotary joint comprising:
an input member defining a through hole extending along a vertical axis of the input member, the input member having a plurality of mounting portions circumferentially protruding from an outer surface of the input member, each two adjacent of the plurality of mounting portions forming a first receiving groove, and a plurality of transmission holes defined in one end surface of the input member around the through hole, an opening of each of the plurality of transmission holes away from the end surface of the input member formed in a sidewall of the first receiving groove; and
an output member rotatably sleeved on the input member, wherein sidewalls of the first receiving groove and an inner wall of the output member cooperatively form a channel, a plurality of outlets is defined in the inner wall of the output member, each outlet is communicating with corresponding one channel and extends through an outer wall of the output member.

2. The rotary joint of claim 1, further comprising a plurality of sealing members, each of the plurality of sealing members is mounted on a corresponding one mounting portion, each of the plurality of sealing members is located between the inner wall of the output member and the outer wall of the input member.

3. The rotary joint of claim 2, wherein a mounting groove is defined in each of the plurality of mounting portions, and each of the plurality of sealing members is mounted in and received in one mounting groove.

4. The rotary joint of claim 1, wherein a plurality of second receiving grooves are recessed in the inner wall of the output member, each of the plurality of second receiving grooves are arranged with a corresponding one first receiving groove, and each channel is cooperatively formed by the sidewalls of the one first receiving groove and a corresponding one second receiving groove.

5. The rotary joint of claim 1, further comprising an upper cover and a bottom cover, the upper cover is fixed with a first end portion of the output member, and the bottom cover is fixedly located at a second end portion of the output member, and the input member protrudes from the bottom cover.

6. The rotary joint of claim 1, further comprising two bearings sleeved on the input member, each of the two bearings is located at one end portion of the input member and positioned between the output member and the input member.

7. The rotary joint of claim 1, wherein each of the plurality of transmission holes comprises a first transmission segment and a second transmission segment connected to the first transmission segment, the first transmission segment extends from the end surface along a direction parallel to the vertical axis of the input member, and the second transmission segment substantially perpendicularly extends from the first transmission segment, the opening is formed in the second transmission segment away from the first transmission segment.

8. A rotary joint comprising:
an input member defining a through hole extending along a vertical axis of the input member;
an output member rotatably sleeved on the input member; and
a plurality of sealing members sleeved on the input member, the plurality of sealing members located between the output member and the input member to form a plurality of hermetical channels enclosing by the output member, the input member and two adjacent sealing members,
wherein a plurality of transmission holes is defined in an end surface of the input member, an opening of each of the plurality of transmission holes is positioned on an outer wall of input member and is communicating with corresponding one channel, a plurality of outlets is defined in the output member, each outlet extends through an outer wall of the output member and is communicating with a corresponding channel.

9. The rotary joint of claim 8, further comprising an upper cover and a bottom cover, the upper cover is fixed with a first end portion of the output member, and the bottom cover is fixedly located at a second end portion of the output member, and the input member protrudes from the bottom cover.

10. The rotary joint of claim 8, further comprising two bearings sleeved on the input member, each of the two bearings is located at one end portion of the input member and positioned between the output member and the input member.

11. The rotary joint of claim 8, wherein each of the plurality of transmission holes comprises a first transmission segment and a second transmission segment communicating with the first transmission segment, the first transmission segment extends from the end surface along a direction parallel to the vertical axis of the input member, and the second transmission segment substantially perpendicularly extends from the first transmission segment, each opening is formed in one second transmission segment away from a respective first transmission segment.

12. A worktable comprising:
a support;
a rotary member rotatably positioned on the support;
a plurality of workstations fixed on the rotary member; and
a rotary joint comprising:
an input member defining a through hole extending along a vertical axis of the input member; and
an output member rotatably sleeved on the input member, wherein a plurality of receiving grooves are formed in an outer wall of the input member or an inner wall of the output member, such that a plurality of channels are formed between the output member and the input member, a plurality of transmission holes are defined in one end surface of the input member, each of the plurality of transmission holes communicating with corresponding one channel, a plurality of outlets is defined in the inner wall of the output member communicating with corresponding one channel; and
a plurality of transmitting conduits communicating with the plurality of outlets.

13. The worktable of claim 12, wherein a plurality of mounting portions protrudes from the outer surface of the input member, one first receiving groove is defined by each two adjacent mounting portion and the outer surface of the input member, and a plurality of second receiving grooves are formed, each one channel is formed by sidewalls of one first receiving groove and corresponding one second receiving groove.

14. The worktable of claim 13, wherein a plurality of sealing members, each of the plurality of sealing members is mounted on a corresponding one mounting portion and located between the inner wall of the output member and the outer wall of the input member.

15. The worktable of claim 14, wherein a mounting groove is defined in each of the plurality of mounting portions, and each of the plurality of sealing members is mounted in and received in the mounting groove.

16. The worktable of claim 12, further comprising an upper cover and a bottom cover, the upper cover is fixed with a first end portion of the output member, and the bottom cover is fixedly located at a second end portion of the output member, and the input member protrudes from the bottom cover, and the bottom cover is positioned adjacent to the support.

17. The worktable of claim 12, further comprising two bearings sleeved on the input member, each of the two bearings is located at one end portion of the input member and positioned between the output member and the input member.

18. The worktable of claim 17, wherein each of the plurality of transmission holes comprises a first transmission segment and a second transmission segment communicating with the first transmission segment, the first transmission segment extends from the end surface along a direction parallel to the vertical axis of the input member, and the second transmission segment substantially perpendicularly extends from the first transmission segment, each opening is formed in one second transmission segment away from corresponding one first transmission segment.

* * * * *